Figure 6:
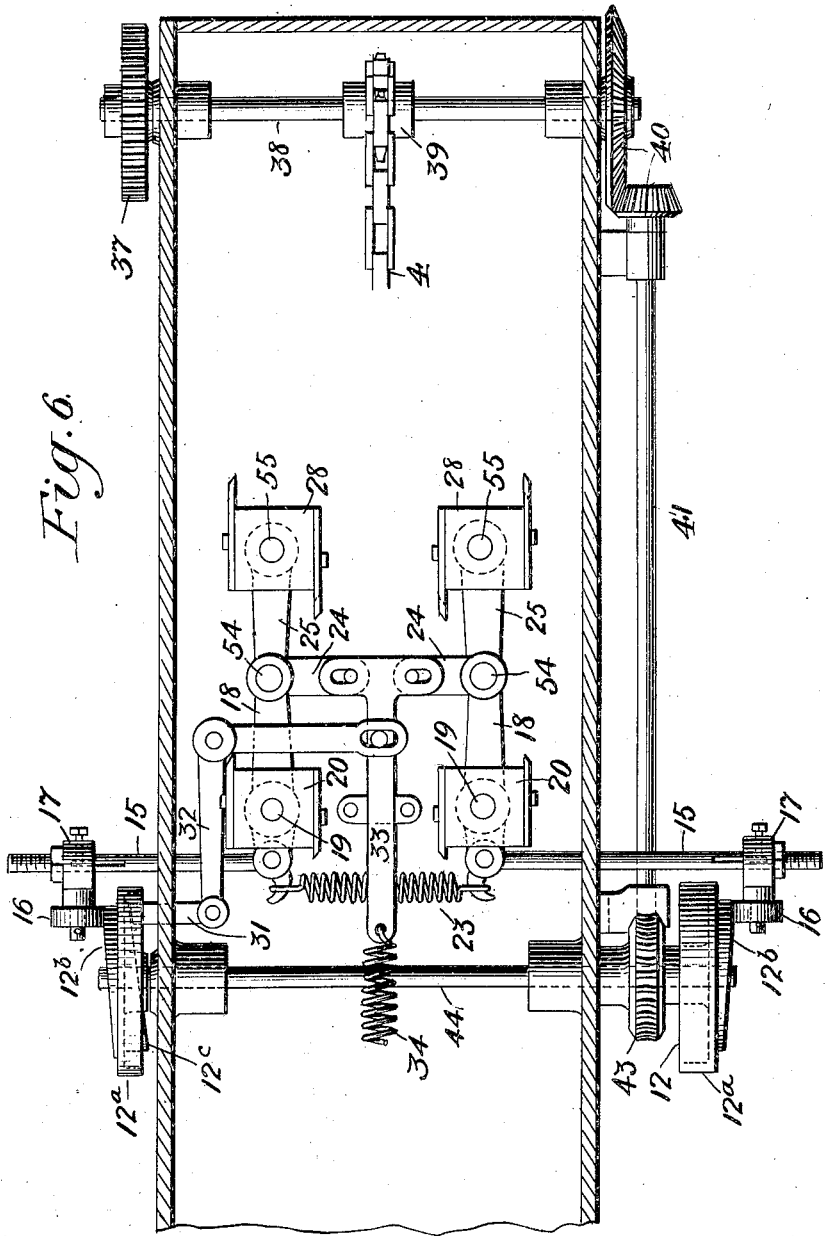

No. 769,980. PATENTED SEPT. 13, 1904.
C. W. BORG.
TONGUE SHAPING MACHINE.
APPLICATION FILED JAN. 12, 1904.
NO MODEL. 8 SHEETS—SHEET 1.
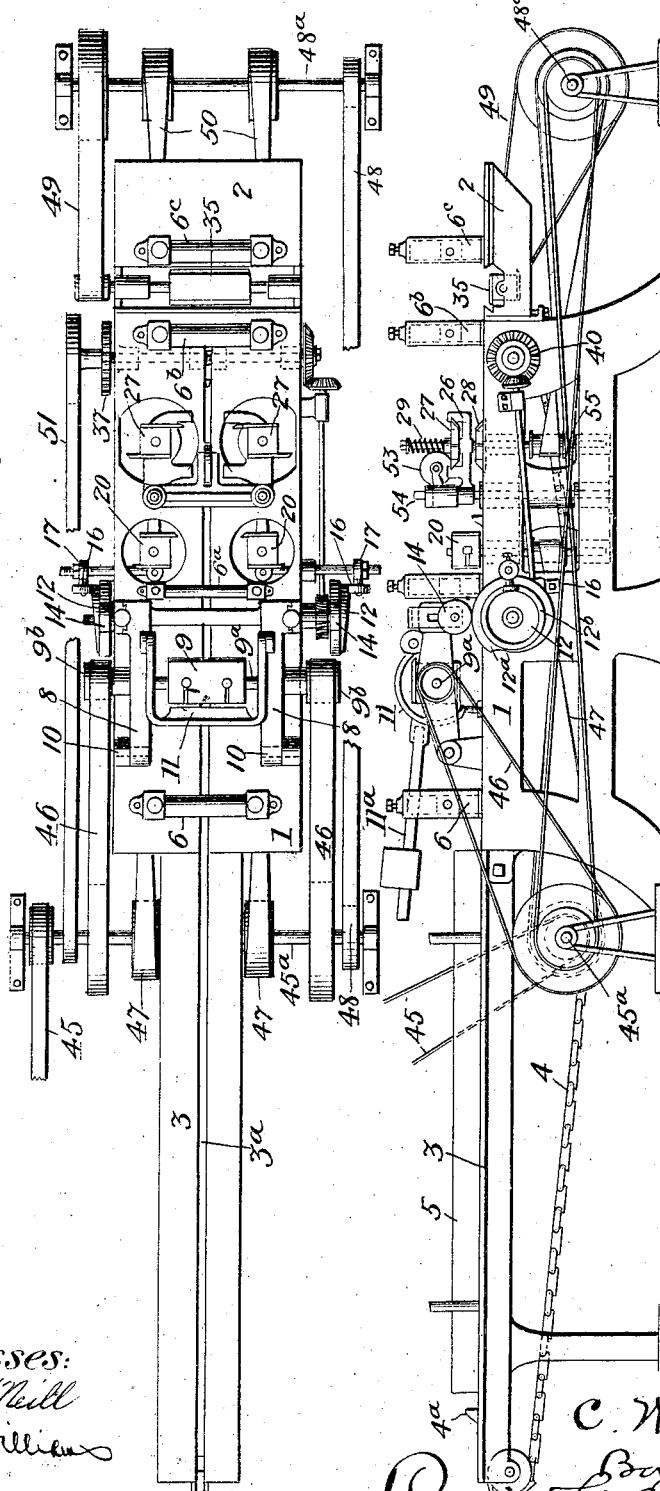
Witnesses:
Chas. J. O'Neill
W. Beattie Williams
Inventor
C. W. Borg
By his attys
Poole & Goldsborough

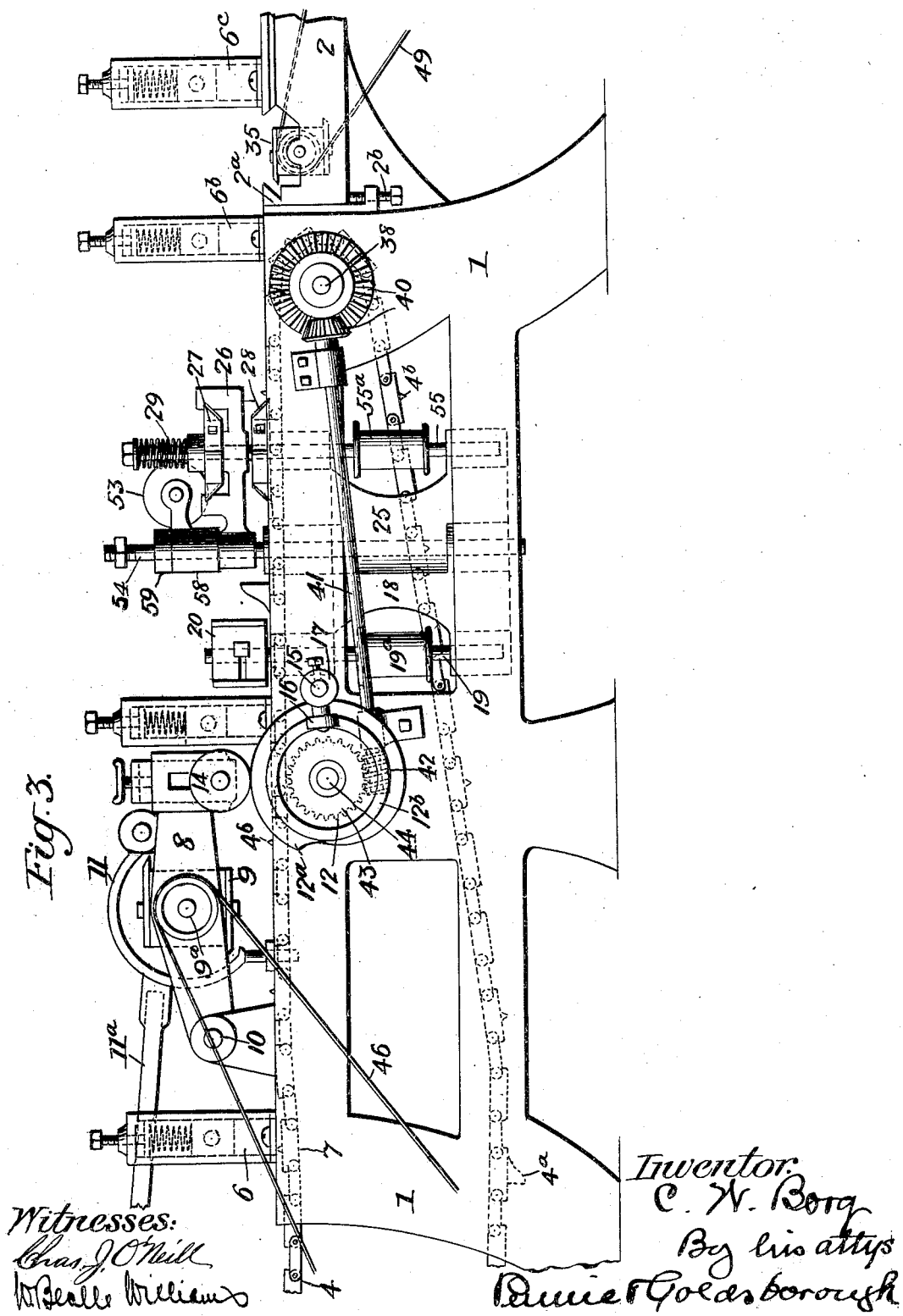

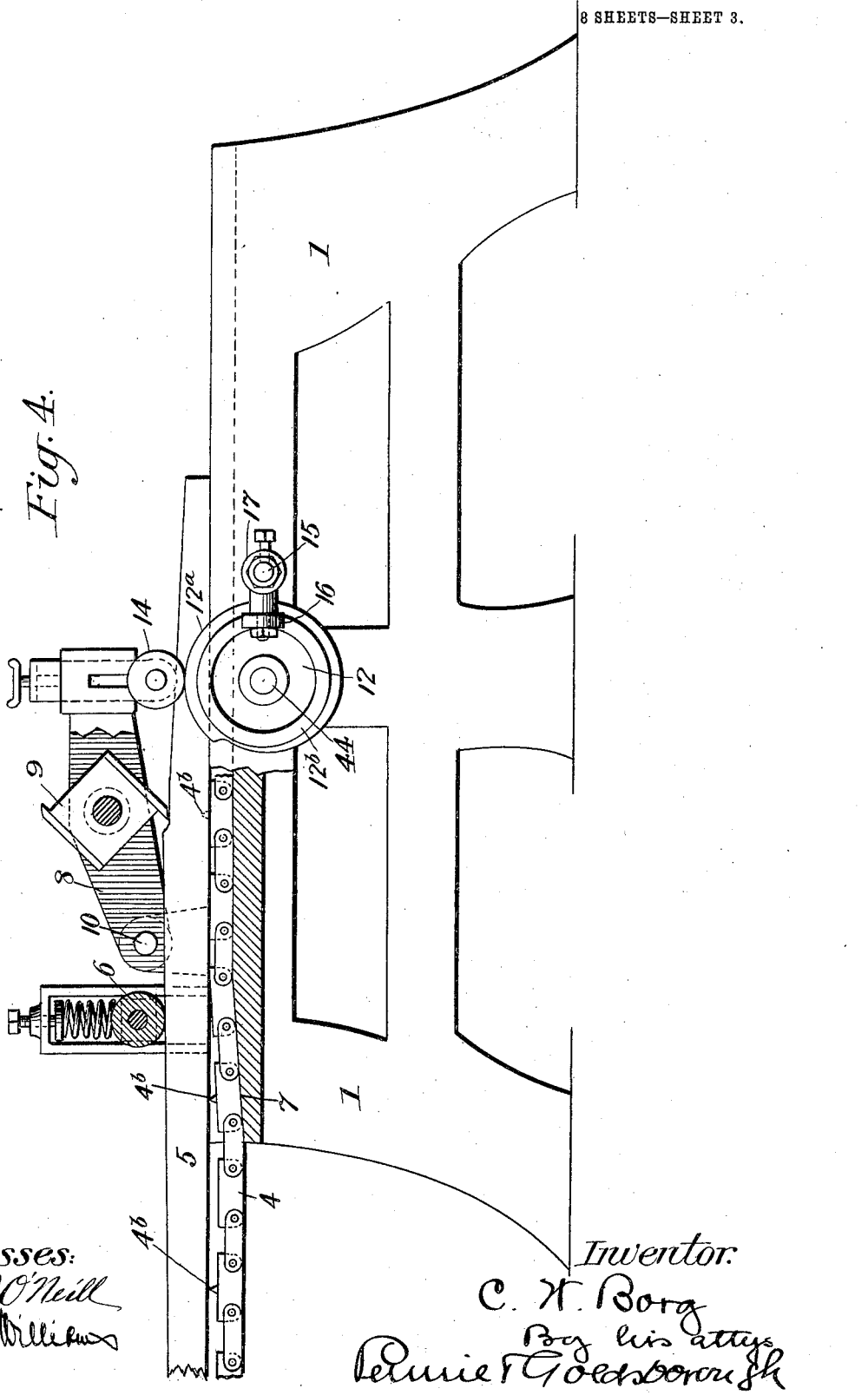

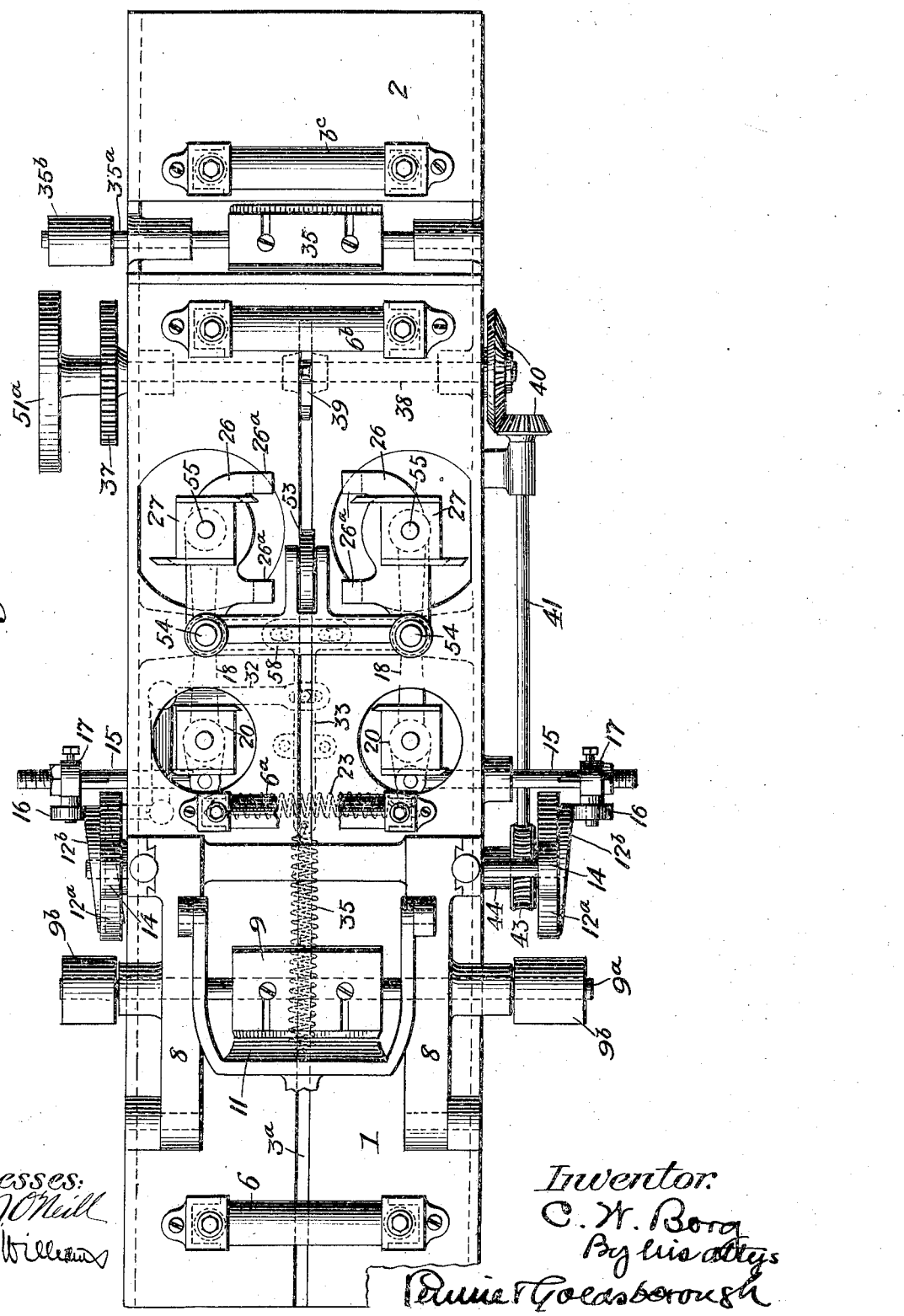

No. 769,980. PATENTED SEPT. 13, 1904.
C. W. BORG.
TONGUE SHAPING MACHINE.
APPLICATION FILED JAN. 12, 1904.
NO MODEL. 8 SHEETS—SHEET 5.

Witnesses:
Chas J O'Neill
W Deale Williams

Inventor.
C. W. Borg
By his attys
Pennie & Goldsborough

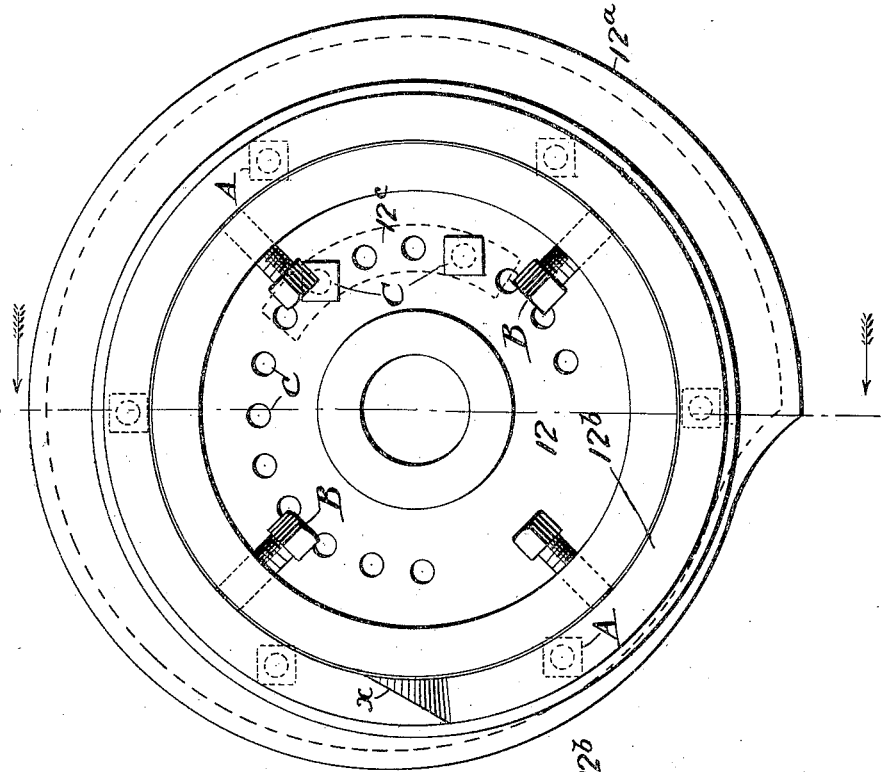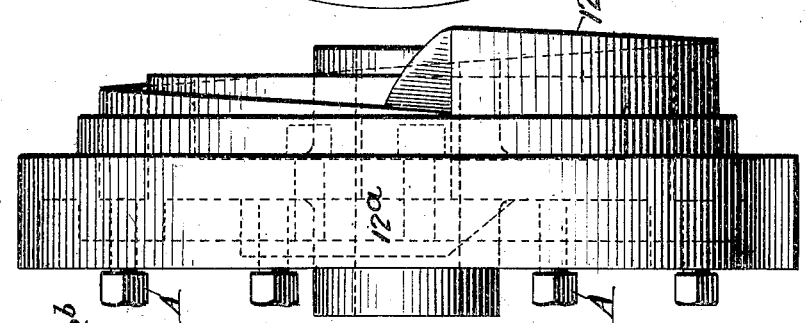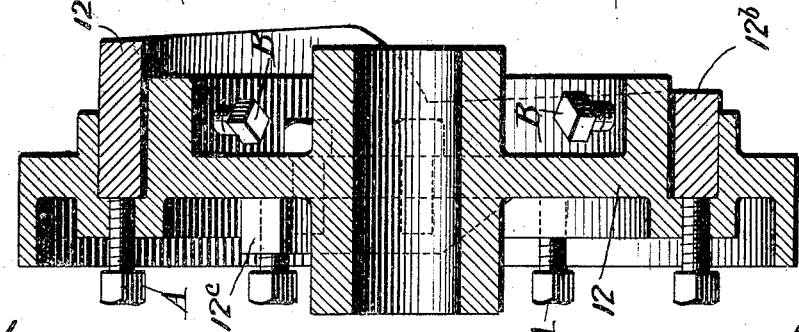

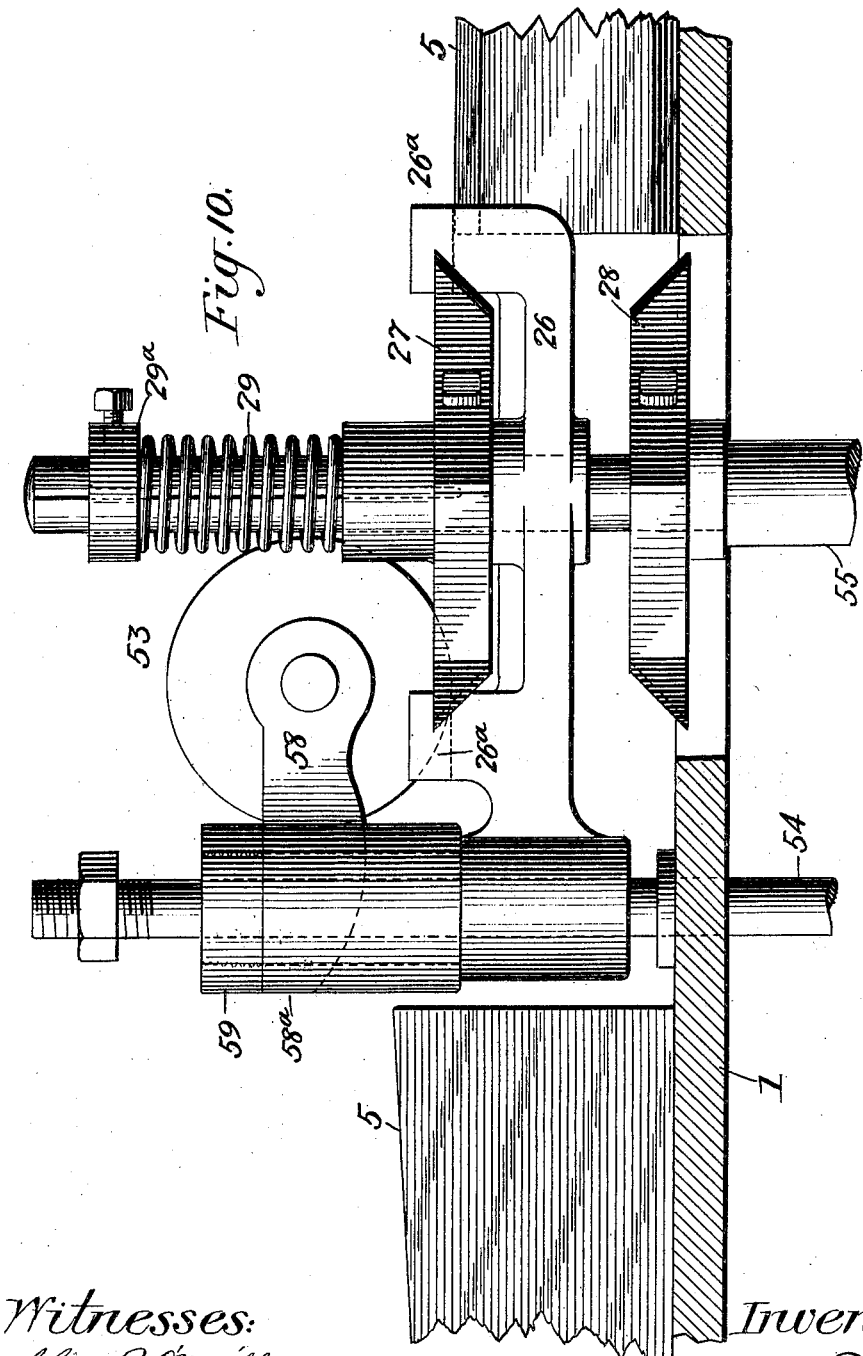

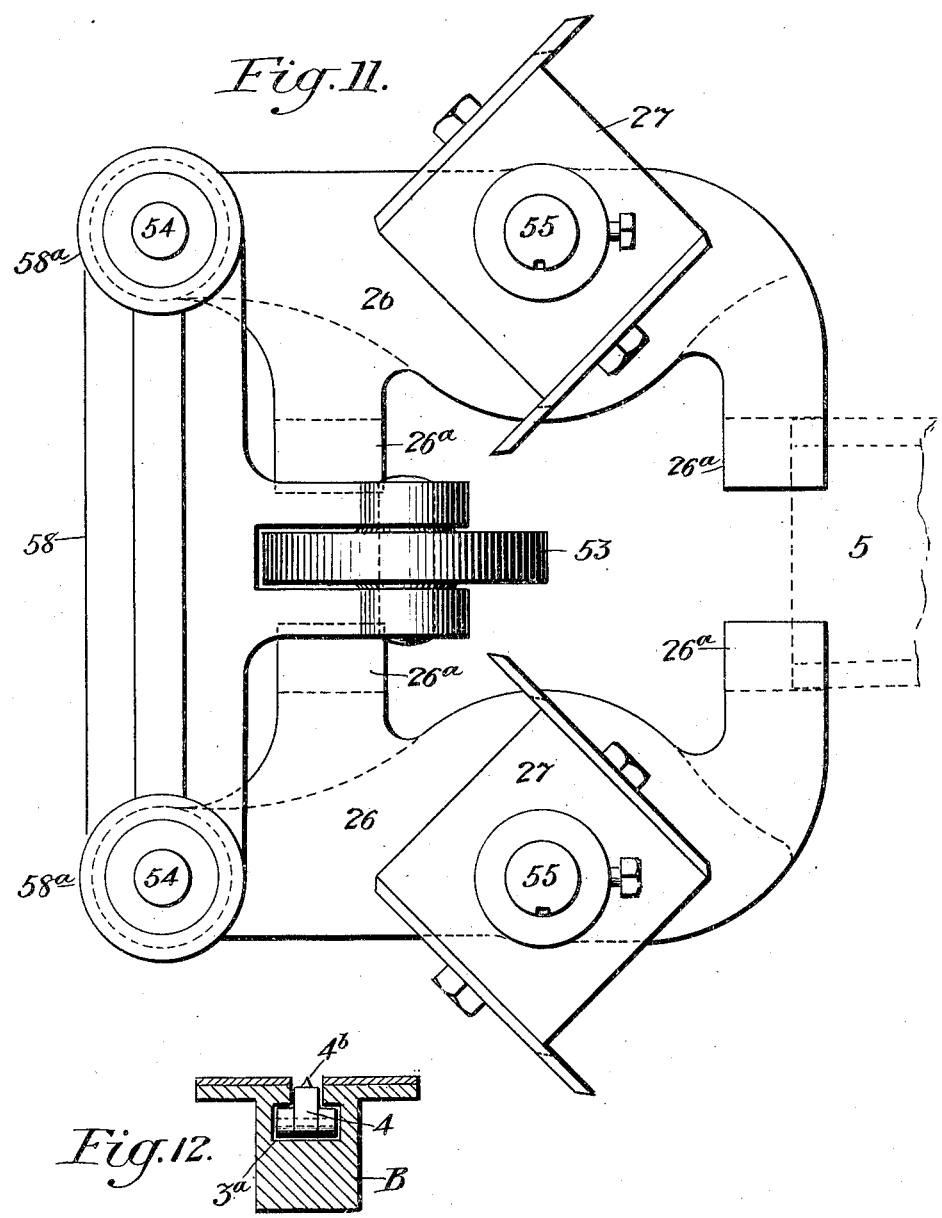

No. 769,980. Patented September 13, 1904.

UNITED STATES PATENT OFFICE.

CHARLES W. BORG, OF ROCK ISLAND, ILLINOIS.

TONGUE-SHAPING MACHINE.

SPECIFICATION forming part of Letters Patent No. 769,980, dated September 13, 1904.

Application filed January 12, 1904. Serial No. 188,727. (No model.)

*To all whom it may concern:*

Be it known that I, CHARLES W. BORG, a citizen of the United States, residing at Rock Island, county of Rock Island, State of Illinois, have invented certain new and useful Improvements in Tongue-Shaping Machines; and I do hereby declare the following to be a full, clear, and exact description of the invention, such as will enable others skilled in the art to which it appertains to make and use the same.

My invention relates to shaping-machines generally, and is more particularly intended to apply to automatic mechanism for shaping and finishing vehicle-tongues and the like from rough-sawed blanks of wood.

To this end the invention consists in the various details of construction and combination of parts hereinafter particularly described and claimed.

In the accompanying drawings, illustrating my invention, Figure 1 is a plan view of the entire machine. Fig. 2 is a side elevation thereof. Fig. 3 is an enlarged view in side elevation of the main parts of the machine. Fig. 4 is a like view, partly in section, showing more particularly the relation of the feed-chain and top cutter-head. Fig. 5 is a top plan view of that portion of the machine shown in Fig. 3. Fig. 6 is a corresponding view with the table-top cut away, showing the arrangement of the pivoted frames for the side and chamfer cutters and the mechanism for controlling the same. Figs. 7, 8, and 9 are enlarged views in sectional, side, and front elevation, respectively, of the pattern-disk. Fig. 10 is an enlarged detail of the chamfer-cutters and the means for guiding and controlling the same. Fig. 11 is a plan view thereof. Fig. 12 is a transverse section of the depressed chainway in the feed-table, showing the relation of the feed-chain and a blank-centering spur.

Generally described, the machine consists of the following parts: The numeral 1 indicates a main frame or table supported by suitable standards and having an auxiliary table 2 adjustably secured at the rear end thereof in vertical guideways $2^a$, so that said auxiliary table may be raised and lowered to vary the bite of the bottom cutter. A feed-table 3, secured at one end to the main table and supported at the other by a suitable standard, is arranged in longitudinal alinement with the middle of the main table and with its top on a level with that of said main table. Longitudinally disposed along the mid-section of the tables 1 and 3 is a depressed chainway or guiding-groove in which runs a feed-chain 4, which passes over suitable sprocket-wheels mounted on the respective table-sections. The bottom of the depressed chainway rises from the end of said feed-table 3 by a short inclined section 7 to the higher horizontal bottom line in the main table, so that while the feeding-faces of both tables are in one and the same horizontal plane the upper face of the chain is below this plane in the feed-table and rises to the level thereof in the main table in an upward incline, for a purpose to be more particularly described hereinafter. Slidably mounted in suitable standards arranged on opposite sides of the center line of the main table are spring-actuated presser-rolls 6, $6^a$, $6^b$, and $6^c$, the first of which is located above the incline 7, above referred to. Pivoted on short pintles 10, mounted on the top of the table, are two arms 8, which constitute a vertically-swinging frame carrying a rotary top cutter 9, mounted upon a horizontal shaft $9^a$, supported in the arms 8 and provided with belt-pulleys $9^b$. The forward ends of the respective arms 8 are provided with bowls or bearing-rollers 14, which may, if desired, be adjusted vertically in their mountings.

Pivoted to the respective arms 8 is a yoke 11, having a downwardly-curved end which engages the top of the blank just ahead of the cutter 9 and serves as a chip-breaker to prevent the wood splintering or slivering under the action of the cutter. A weighted arm $11^a$, secured to said yoke, tends to move the chip-breaker downward into operative engagement with the blank.

The bowls 14 engage the peripheral edge cams $12^a$ of rotary pattern-disks 12, which are supported one on each side of the machine by a cross-shaft 44.

Secured in the machine-frame, one on either side of the middle line thereof, are two pivot-shafts 54 54, upon which are mounted the supports of side cutters 20 20 and chamfering-cutters 27 and 28. Each of the side-cutter supports consists of a yoke-shaped frame 18, mounted for lateral adjustment on the shaft 54 aforesaid, said frame having a revoluble shaft 19 mounted in the yoke ends and provided with a vertical belt-pulley 19$^a$ between said ends and a side cutter-head 20 on the end thereof above the table-top. The forward ends of the yokes or frames 18 are connected by a stout spiral spring 23, which serves to draw the free ends of the frames and the rotary cutters supported thereby toward each other—that is, toward the middle line of the table. In order to swing the side cutters and their supporting-frames outward to the right and left, respectively, from the middle line of the machine, there is pivotally attached to the free end of each yoke a pull-rod 15, upon the outer end of which is adjustably secured a collar 17, which carries a bowl or roller 16, engaging a cam or incline 12$^b$ on the face of the pattern-disk 12, as shown in Fig. 6.

The chamfering-heads, which are provided in sets of two arranged on opposite sides of the table and serve to operate on the four corners of the blank simultaneously, are supported on rotary shafts 55 55, which in turn are carried by laterally-swinging frames or yokes 25 25, pivoted to the respective shafts 54 54 aforesaid.

Rotary motion is imparted to shafts 55 55 from belt-pulleys 55$^a$. Each set of chamfering-cutters consists of a lower cutter-head 28, fixed to the rotary shaft, and an upper cutter-head 27, splined to said shaft in order to permit said head to be adjusted vertically thereon. A spiral spring 29, surrounding said shaft, bears upon the upper cutter-head 27 and tends to force the latter toward the lower cutter-head and into proper engagement with the upper corner of the blank. Slidably mounted on the shafts 54 55 are two guides or gages 26 26, each provided with upwardly and inwardly extending arms 26$^a$, between which cutter-head 27 rotates and with which the side and top of the blank engage to swing the corresponding frame 25 and cutter-heads 27 28 laterally and also to move the cutter-head 27 vertically in order to bring the latter into proper adjustment to chamfer the upper corner of the blank. Each of said frames 25 is provided with an inwardly-projecting ear or lug 24, which is connected by a pin-and-slot joint with the T-head of a pull-rod 33, which is normally retracted by a spring 34 to swing said frames and the cutters supported thereby inward toward the middle line of the machine. Connected with the pull-rod by a pin-and-slot joint is a bell-crank 32, pivoted to the under side of the machine-frame and carrying at its outer end a push-rod 31, which is adapted to be engaged by a throw-out cam 12$^c$ on the inner face of one of the pattern-disks when it is desired to throw the chamfering-cutters out of operative engagement with respect to the blank.

A yoke 58, mounted at its ends on the reduced ends of the journals of the gages 26 and secured thereto for concurrent movement by the nuts 59 59, is provided with a gage-wheel 53, which is adapted to engage the upper face of the blank before the latter passes between the gages 26 26, and thereby lift said gages 26 26 and the upper cutters 27 27 into proper relation to operate on the upper corners of said blank.

A rotary cutter 35, mounted upon a horizontal shaft 35$^a$ and driven by a belt-pulley 35$^b$, is located on the auxiliary table 2 and between the final presser-rolls 6$^b$ and 6$^c$ in position to operate on the under side or bottom of the blank and impart the final finishing operation to said blank. By adjusting said table 2 vertically the depth of the cut taken from the under side of the blank may be regulated.

The pattern-disks each comprises a central web provided with a peripheral edge cam 12$^a$, a portion of which is concentric with the disk and the remainder is eccentric thereto, the two portions being joined by a sharp inclination. The face of the disk has a concentric groove in which is loosely fitted a cam-ring 12$^b$, the outer face of which is inclined circumferentially, the highest and lowest points of said incline being united by a sharp drop or inclined section. The said cam-ring is split by a vertical laterally-inclined kerf $x$ passing through said ring at the sharp incline between the highest and lowest portions of said ring to permit the ends of the ring to be adjusted toward or from the web, and thereby vary the degree of inclination of the ring to regulate the throw of the cam. In order to permit this adjustment of the cam-ring and to secure the latter rigidly in place within the groove, the pattern-disk is provided with adjusting-screws A A, which pass through the bottom of the groove and engage the under edge of said ring, and a series of set-screws B B, which are mounted in the flanged wall of said groove and bind against the interior face of said cam-rings 12$^b$. The rear face of the pattern-disk is provided with a circular series of bolt-holes $c$ to allow for the circumferential adjustment of a stop or throw-out cam 12$^c$, which consists of a segmental plate having an inclined end, which plate is securely attached to the pattern-disk by means of the bolts C passing through holes in said plate and engaging the registering holes in the disk-face.

Power is supplied to the various parts of the machine hereinafter described from a belt 45, which drives a main counter-shaft 45$^a$, from which is driven two crossed belts 47 47, which engage the respective pulleys 19$^a$ on the side cutter-heads 20. Two side belts 46 46 take power from said shaft 45$^a$, pass over the pulleys 9$^b$, and impart a rapid rotary motion to the top cutter 9. A second counter-shaft 48$^a$, located at the rear end of the machine, is driven by a cross-belt 48 and in turn drives the shaft of the bottom cutter 35 by means of a belt 49 and the rotary spindles 55 55 of the chamfer-heads through crossed belts 50 50. A transverse shaft 38, mounted in the machine-frame, is driven from main counter-shaft 45$^a$ by a belt 51. On said shaft 38 is mounted a sprocket-wheel 39, which serves to drive the feed-chain 4. On the outer end of said shaft 38 is mounted one of two bevel-gears 40, which impart relatively slow rotary motion to a shaft 41, upon which is mounted a worm-wheel 43 and driving-shaft 44, upon which pattern-disks 12 12 are mounted.

In shaping and finishing vehicle-tongues the work comes to the machine in the form of a tongue-blank 5—viz., a section of wood of proper thickness, preferably having parallel top and bottom lines, with side lines taper-sawed to avoid cutting away of the stock in unnecessary quantity in giving the tongue its taper form.

It may be explained that in common practice tongues are finished straight on the bottom line and are variously tapered toward the neck-yoke end on the top and side lines, the corners being appropriately chamfered.

Briefly stated, the process of shaping a tongue is as follows: The blank 5 is fed into and through the machine by the positive and continuous action of the feed-chain 4, the blank passing under the several presser-rollers 6, 6$^a$, 6$^b$, and 6$^c$, where it is engaged and operated upon successively by the several shaping cutter-heads 9, 20, 27, 28, and 35. In entering the machine the blank first passes under the top cutter-head 9, which dresses the top face, then between the side cutter-heads 20 20, which give the taper shape to the sides, then between the pairs of chamfering cutter-heads 27 and 28, which finish the corners in any chamfer desired, and, lastly, over the bottom cutter-head 35, which dresses and finishes the bottom face, after which the blank is forced out of the machine a finished tongue.

It will be understood that the pattern-disks 12 12, through their several cam-faces and the roller and rod connections with the cutter-heads hereinbefore described, produce the up-and-down and in-and-out movements of the cutter-heads and impart the particular pattern expressed in the cams on the pattern-disks to the tongue. It is also to be noted that since the design of the tongue is determined by the cams 12$^a$, 12$^b$, and 12$^c$ of the circular pattern-disks there must be one complete revolution of each disk while each blank is passing through the machine and that there must be a carefully-timed relation between the pattern-disk and the feed-chain—that is to say, at the instant the feed-tooth 4$^a$ of the chain has brought a blank forward to a point in its travel through the machine when the shaping operation begins the pattern-disks must be at the initial point of their operative revolution and coöperative engagement with the several cutter-heads. It may be noted that the pattern design may be expressed in less than the complete peripheral length of the disks. For instance, two distinct patterns may be applied to each disk-periphery; but for purposes of illustration and for working blanks of such considerable length as vehicles-tongues a construction of pattern-disk providing a single pattern for each revolution is preferable.

In the particular embodiment of the invention hereinbefore described the machine plan by means of which the timing of the pattern-disks and the feed-chain is accomplished is as follows: For every ten revolutions of the feed-shaft 28 the disks are given one full revolution and the chain is given a feeding movement of forty links. As said chain is made up of one hundred and twenty links, it follows that for each circuit of the feed-chain the pattern-disks make three revolutions, and as the chain is provided with three feed-teeth 4$^a$, equally spaced, three finished tongues are turned out at each complete circuit of the chain.

It is of primary importance in the control of the blank while it is being shaped in its passage through the machine that its bulk or stock be accurately held half on each side of the center line of the machine, with reference to which the right and left side cutters are set. This is preferably accomplished by means of the blank-centering spurs 4$^b$, as follows: It will be noted from the foregoing description that the depressed way 3$^a$, in which the feed-chain travels throughout the entire length of the feed-table and the machine proper, is in the exact center line of the machine, the chain fitting the way with sufficient accuracy to prevent any side play of the chain off the machine center. This being true, after the centering-spurs of the chain have been forced into the under face of the blank as the chain passes up the inclined section 7 of the way beneath the initial presser-roll 6 a blank moves through the machine without side play and at equal distances from the right and left cutter-heads, so that a proper amount of stock is cut from each side of said blank, and the tongue is thereby made perfectly straight even if a crooked blank is employed, provided, of course, that sufficient stock is allowed in the blank to leave a full tongue after the curves and twists, if any, are dressed away. The arrangement of the chainway at a lower level in the feed-table prevents the spur-points 4$^b$ from entering the under face of the blank while the latter is traveling on the feed-table, so that ample time is allowed for accurately centering the blank before the spurs engage the blank as the chain passes from the lower to the higher level of the chainway. The spurs are so spaced on the chain with reference to the feed-table 3 and the length of the blank that at the instant the first end of the blank is well under the initial presser-roll 6, which holds it firmly down upon the top of the main table, a centering-spur is at the beginning of the rising incline in the chainway, and when the spur has passed up the incline and reached the high level of said way the chain has risen so that its top face is on a level with the bottom of the blank and of necessity the spur has been forced its full length into the blank by the combined action of the incline and the presser-roller. Of course the feed-teeth 4ª are of sufficient height to engage the rear end of the blank when the latter is placed upon the feed-table, notwithstanding the fact that the feed-chain at this point engages the lower level of the chainway in said feed-table, thereby lowering the feed-teeth relatively to the top face of the feed-table. It has been found in practice that without these centering-spurs or their equivalent the machine will not turn out straight tongues, as the blank is liable to shift sidewise while passing through the machine, as the side cutter-head having the hardest stock or the greatest quantity thereof to cut away forces the blank toward the other head, thereby making a crooked and irregular tongue. Side guides cannot be made effective without greatly complicating the mechanism, since the width of the tongue horizontally is constantly varying by reason of its tapering design.

The top cutter-head 9 must, as a rule, dress the top face of the tongue on planes out of the horizontal, sometimes with a rising and sometimes with a falling taper. For this reason said cutter-head is mounted in the horizontal pivoted frame, the up-and-down motion of which is controlled by the pattern-disks 12 12, the weight of said frame and cutter-head, together with the downward pull of the driving-belts 46 46, being sufficient to cause the bowls or traveler wheels 14 14 to remain in contact with the peripheral cam edges 12ª 12ª of the cam-disks 12 12. By varying the contour of these cam edges any desired shape may be imparted to the top of the tongue.

The pivoted weighted chip-breaker 11 rests upon the top face of the blank very near the cutting edge of the head 9, and its weight prevents the stock from splintering ahead of the knife, particularly in cutting rising tapers.

In order to work out the ordinary designs of tongue, side cutter-heads 20 20 are rotatably mounted in vertically-pivoted frames 18 18, which are given the necessary movements toward and from the middle line of the machine. The in-and-out shaping movements of these heads are imparted by the face-cams 12ᵇ 12ᵇ on the cam-disks through the roller-rods 15 15 and the cam travelers or bows 16 16. The heads are normally held up to their work by the spring 23, which also holds the travelers in contact with the cam-faces 12ᵇ at all times, so that as the pattern-disks revolve the side cutters are moved in and out and the design expressed in the lines of the face-cams 12ᵇ 12ᵇ is accurately produced in the finished tongue.

The chamfering-heads are four in number, arranged in right and left hand pairs 27 and 28, and the upper members, 27, of each pair chamfer the upper corners of the tongue, and the lower members, 28, correspondingly chamfer the lower corners. As the blank which has had the proper taper imparted to its top and sides passes toward the chamfering-cutters its end strikes the gage-wheel 53 and lifts yoke 58 and the connected gages 26 26, together with the upper splined cutter-heads 27 27, sufficiently to permit the blank to enter between the several chamfer-cutters and allow the latter to engage the respective corners and trim off the stock to the desired depth along the corners. The chamfering-heads are made to follow the desired design by gaging them against the finished top and side lines of the tongue rather than by controlling them from pattern-disks. The tapered top and sides of the blank pass between and under the gages 26, the latter serving to swing the vertically-pivoted frames 25, carrying the spindles of the taper-cutters, laterally and also hold the upper cutters 27 at a proper elevation, so that the respective cutters trim off just a sufficient quantity of stock from the corners. As the taper of the top or the thickness of the blank varies, the upper cutters are moved up by the guides 26 26 and 53 or down by the springs 29 29, and as the side taper varies the gages 26 26, following the change in the contour of the tongue, force the frames carrying the cutter-spindles outward laterally, and the spring-actuated pull-rod 33, connected to the cutter-frames 25 25, draws the cutters up to the work. At such points in the tongue where no chamfering of the corners is desired the throw-out mechanism, comprising the cam 12ᶜ on one of the pattern-disks, the push-rod 31, bell-crank 32, and pull-rod 33, are brought into coöperative engagement and serve to move the frames 25 25 and the cutters supported therein laterally away from the middle line of the machine and out of engagement with the blank. When the pattern-disk has revolved a sufficient distance to disengage the push-rod 31 and the stop-cam 12ᶜ, spring 34 actuates pull-rod 33 to swing the chamfer-cutter frames inward and cause the chamfering cutter-heads again to engage the blank. By properly designing the throw-out cam 12ᶜ and properly locating and adjusting it on the pattern-disk any desired variation in the chamfer imparted to the tongue can be produced. It is to be particularly observed that the entire operation of these chamfering-cutters except the throw-out operation is directly controlled by the blank itself, and an accurate and even chamfer of any desired character will be automatically produced as the blank is fed through the machine. After the blank passes through the chamfering-cutters the under side comes into engagement with the bottom cutter 35, which trims and finishes this surface by taking a uniform cut from the same throughout the length of the blank, and the latter is then delivered from the machine as a finished tongue.

The primary purpose of the pattern-disks 12 is to permit tongues or finished forms of different or varying top and side tapers or varying and irregular shapes to be turned out by the same machine. For this purpose the disks are readily removable from the shaft 44, and should it be found necessary to turn out a tongue with a different top taper they are replaced by similar disks in which the edge cams are varied—that is, made with higher or lower inclines—as will be obvious to those skilled in the art. When it is found necessary to vary the amount of the side taper, the face-cam ring $12^b$ may be adjusted in or out bodily by means of the adjusting-screws A and set-screws B or the degree of inclination of said cam-ring regulated by adjusting one end of said ring while the other end is held rigidly in position. In the latter operation all the set-screws except that one holding the end of the split ring, which is to remain stationary, are loosened and the adjusting-screws A are moved in or out, as the case may be, to gradually lower or raise the free portion of the cam-ring by amounts sufficient to give the edge of said cam-ring the desired inclination, after which the screws B are set up to hold said ring in its adjustable position.

While the above description has been particularly directed to a tongue-shaping machine, it is to be understood that the invention is not limited to machines of this particular class, but is adapted to and capable of doing general shaping in wood, and by properly fashioning the pattern-disks any desired form or configuration be given the four sides of a blank or to any of said sides.

Having thus described my invention, what I claim is—

1. In a machine of the character described, the combination of means for feeding a blank to be shaped, a rotary cutter for the top of the blank, rotary cutters for the sides of the blank, pattern-disks controlling the top and side cutters, cutters for chamfering the corners of the blank, and means coöperating with and controlled by the blank for controlling the chamfering-cutters.

2. In a machine of the character described, the combination of means for feeding a blank to be shaped, a rotary cutter for the top of the blank, rotary cutters for the sides of the blank, pattern-disks controlling the top and side cutters, cutters for chamfering the corners of the blank, means coöperating with the side of the blank for moving the chamfering-cutters laterally, and means coöperating with the top of the blank for varying the relation of said chamfering-cutters vertically.

3. In a machine of the character described, the combination of means for feeding a blank to be shaped, a rotary cutter for the top of the blank, rotary cutters for the sides of the blank, pattern-disks controlling the top and side cutters, two sets of cutters for chamfering the upper and lower corners on the respective sides of the blank, frames in which the sets of chamfering-cutters are mounted for lateral movement, and means coöperating with the blank for moving said frames laterally.

4. In a machine of the character described, the combination of means for feeding a blank to be shaped, a cutter for the top of the blank, rotary cutters for the sides of the blank, pattern-disks controlling the top and side cutters, two sets of cutters for chamfering the upper and lower corners on the respective sides of the blank, laterally-movable frames in which the sets of chamfering-cutters are mounted, gages coöperating with the sides of the blank for moving said frames laterally and with the top of the blank for varying the relation of the chamfering-cutters vertically.

5. In a machine of the character described, the combination of means for feeding a blank to be shaped, two sets of cutters for chamfering the upper and lower corners on the respective sides of the blank, laterally-movable frames in which the respective sets of chamfering-cutters are journaled, and gages mounted on the cutter-shafts and coöperating with the sides of the blank for moving the frames laterally and with the top of the blank for varying the relation of the cutters of the respective sets vertically.

6. In a machine of the character described, the combination of means for feeding a blank to be shaped, two sets of cutters for chamfering the upper and lower corners on the respective sides of the blank, laterally-movable frames in which the respective sets of chamfering-cutters are journaled, gages mounted on the cutter-shafts and coöperating with the sides of the blank for moving the pivoted frames laterally and with the top of the blank for varying the relation of the cutters of the respective sets vertically, and means for throwing said chamfering-cutters out of coöperative engagement with the blank at a predetermined point.

7. In a machine of the character described, the combination of means for feeding a blank to be shaped, two sets of cutters for chamfering the upper and lower corners on the respective sides of the blank, the top cutter of each set being vertically movable on its shaft, laterally-movable frames in which the respective cutter-shafts are journaled, and gages mounted for vertical movement on the cutter-shafts below the top cutters and coöperating with the sides and top of the blank to move the respective sets of cutters laterally and the top cutter of each set vertically.

8. In a machine of the character described, the combination of means for feeding a blank to be shaped, two sets of cutters for chamfering the upper and lower corners on the respective sides of the blank, the top cutter of each set being vertically movable in its shaft, laterally-movable frames in which the respective cutter-shafts are journaled, gages mounted for vertical movement on the cutter-shafts below the top cutters and coöperating with the sides and top of the blank to move the respective sets of cutters laterally and the top cutter of each set vertically, a vertically-movable yoke connected to said gages, and a gage-wheel mounted in said yoke and adapted to engage the top of the blank and lift the upper cutters as the blank passes between the latter.

9. In a machine of the character described, the combination of rotary cutters, means for controlling the same for shaping the blank, presser-rolls for holding the blank on the machine-frame, a chain for feeding the blanks, a depressed guideway for said chain having an incline adjacent to the initial presser-roll, and a centering-spur on said chain adapted to be forced into the under side of said blank as the latter is fed between the presser-roll and the incline in the guideway.

10. In a machine of the character described, the combination of a main table, a feed-table adjacent thereto, a chain for feeding the blanks extending longitudinally of said tables, a blank-centering spur on said chain, a depressed guideway in said tables for said chain, the bottom of said guideway rising from the end of said feed-table by a short inclined section to the higher horizontal bottom line thereof in the main table, and a presser-roll above the incline and coöperating therewith to force the centering-spur into the blank.

11. In a machine of the character described, the combination of a top cutter, a movable frame in which the same is journaled, means for holding the cutter in contact with the top of the blank, side cutters, laterally-movable frames in which the respective side cutters are mounted, a spring connection between the side-cutter frames for holding the cutters in contact with the sides of the blank, and rotary pattern-disks provided with edge and face cams coöperating respectively with the top-cutter frame and the side-cutter frames for moving the respective cutters to shape the blank.

12. In a machine of the character described, the combination of top, bottom and side cutters and corner-chamfering cutters, movable frames supporting the top, side and chamfering cutters, means for forcing the cutters into contact with the blank, and rotary pattern-disks, provided with edge and face cams coöperating respectively with the top and side cutter frames for controlling the respective cutters carried thereby, one of said disks being provided with a cam coöperating with a throw-out mechanism for the chamfering-cutter frames.

13. In a machine of the character described, the combination of shaping-cutters, and a pattern-disk controlling the same, comprising a central web provided with a peripheral edge cam, a cam-ring mounted in a groove in the disk, and means for adjusting said cam-ring in said groove.

14. In a machine of the character described, the combination of shaping-cutters, and a pattern-disk controlling the same, comprising a central web provided with a peripheral cam, an annular inclined cam-ring mounted in a groove in the face of said disk, and means for adjusting the ring in said groove to vary the inclination of said cam.

15. In a machine of the character described, the combination of shaping-cutters, and a pattern-disk controlling the same, comprising a central web provided with a peripheral edge cam, an annular split ring having an inclined edge and mounted in an annular groove in the face of said disk, and means for adjusting the height of the respective ends of said split ring to vary the inclination of the edge of the ring.

16. In a machine of the character described, the combination of shaping-cutters, and a pattern-disk controlling the same; comprising a central web provided with a peripheral edge cam, an annular split ring having an inclined edge and mounted in an annular groove in the face of the disk, adjusting-screws in said disk for varying the height of the respective ends of said split ring, and set-screws engaging said ring to hold the same in adjusted position.

17. In a machine of the character described, the combination of shaping-cutters, and a pattern-disk controlling the same, comprising a central web provided with a peripheral edge cam, a tapering split ring mounted in an annular groove in the disk, means for adjusting the degree of taper or incline of said ring, and a segmental throw-out cam adjustably mounted on said disk.

18. In a machine of the character described, the combination of top and side shaping-cutters, the rotary shaft 44, and the cam-disks 12, 12 mounted thereon, each of said disks having an edge cam $12^a$ and a face-cam $12^b$ coöperating with the top and side cutters respectively, and one of said disks having a throw-out cam $12^c$.

19. In a machine of the character described, a chamfering-cutter, comprising a rotary spindle, a lower cutter-head fixed to said spindle, an upper cutter-head splined to said spindle, means for forcing the upper cutter-head toward the lower head, and a gage controlled by the blank to be chamfered for moving the upper cutter-head vertically.

20. In a machine of the character described, a chamfering-cutter, comprising a laterally-movable rotary spindle, a lower cutter-head fixed to said spindle, an upper cutter-head splined to said spindle, a spring on said spindle engaging the upper head to force the latter toward the lower head, and a gage controlled by the upper face of the blank to move the upper head vertically, and with the side of the blank for moving the spindle and both heads laterally.

21. In a machine of the class described, the combination of means for feeding a blank to be shaped, a chamfering-cutter, comprising a fixed cutter-head and a movable cutter-head both mounted on the same rotary shaft, the movable head being movable toward and from the fixed head so as to follow the outline of the blank and engage the corners thereof, and means controlled by the blank to be chamfered for moving the movable cutter-head.

In testimony whereof I affix my signature in presence of two witnesses.

CHARLES W. BORG.

Witnesses:
EMIL HEIMBREK,
MARSHALL BECK.